US006929051B2

(12) United States Patent
Peterson et al.

(10) Patent No.: US 6,929,051 B2
(45) Date of Patent: Aug. 16, 2005

(54) PITTED MOLD

(75) Inventors: Norman E. Peterson, Wyoming, MN (US); Tracy L. Cain, Forest Lake, MN (US)

(73) Assignee: Water Gremlin Company, White Bear Lake, MN (US)

( * ) Notice: Subject to any disclaimer, the term of this patent is extended or adjusted under 35 U.S.C. 154(b) by 178 days.

(21) Appl. No.: 10/225,758

(22) Filed: Aug. 22, 2002

(65) Prior Publication Data

US 2004/0035544 A1 Feb. 26, 2004

(51) Int. Cl.[7] ............................ B22D 17/22; B28B 7/34
(52) U.S. Cl. ........................ 164/113; 164/303; 249/135
(58) Field of Search ......................... 164/113, 303–318; 249/135

(56) References Cited

U.S. PATENT DOCUMENTS 6,267,171 B1 * 7/2001 Onuki et al. ................ 164/284

FOREIGN PATENT DOCUMENTS

JP 4-135042 * 5/1992

* cited by examiner

*Primary Examiner*—Kuang Y. Lin
(74) *Attorney, Agent, or Firm*—Jacobson & Johnson

(57) ABSTRACT

A mold and a method of casting a part wherein the casting surfaces of the mold including the nooks and crannies of the mold are bounded by pitted mold surfaces with the pitted mold surfaces having surface voids therein that are sufficiently small to prevent the molten metal to enter therein; however, when the molten metal is poured in the mold having the pitted surfaces the molten metal solidifies on top of the pitted surface without entering into the pits in the mold surface, yet at the same time the molten metal flows smoothly over all the mold surfaces including the structural nooks and crannies of the mold to form a cast product that is substantially free of voids and fissures.

14 Claims, 1 Drawing Sheet

14
15
13a
10
13
12
11

13
12
11

12
20
11

20a
21
23
21
23
21
21
23
21
24

6
39
30
31
32
6
33
34
35
36

41
40
32

46
45
47
48

PITTED MOLD

FIELD OF THE INVENTION

This invention relates generally to casting and, more specifically, to pitted molds and a method of gravity casting battery parts with pitted molds to inhibit the formations of voids or fissures in the cast part.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of gravity casting lead or lead alloy parts is well known in the art. One of the problems in the art is the formation of voids or fissures in the cast product even though the mold surface is smooth and free of obstructions. In order to avoid formation of voids or fissures in the cast part the mold surfaces are periodically sprayed with a solution of sodium silicate and finely ground cork particles to improve the quality of the cast product.

In contrast, the present allows one to inhibit the formation of voids and fissures in cast articles and particularly gravity cast-lead or lead alloy articles though formation of pitted surfaces on the mold. The mechanism of how the pitted mold surface inhibits the formation of voids and fissures in the part formed therein is not fully understood. In general the mold surface is pitted through a process such as electronic discharge machining or the like which allows one to control the pitting of the mold surface. The pitting of the mold surface produces tiny voids in the mold surface. The voids are maintained sufficiently small so the molten metal does not flow therein yet at the same time the molten metal flows over the pitted surface and solidifies with a finish that is substantially free of voids and fissures that would normally occur if the mold surface were smooth.

SUMMARY OF THE INVENTION

The present invention comprises a mold and method of casting a part wherein the flat surfaces of the mold and the nooks and crannies of the mold are bounded by pitted mold surfaces with the pitted mold surfaces having surface voids therein that are sufficiently small to prevent the molten metal to enter therein; however, when the molten metal is poured in the mold having the pitted surfaces the molten metal solidifies on top the pitted surface without entering into the pits in the mold surface, yet at the same time the molten metal flows smoothly over all the flat surfaces and the structural nooks and crannies of the mold to form a cast product that is substantially free of voids and fissures.

DESCRIPTION OF THE PREFERRED EMBODIMENT

Figure 1:
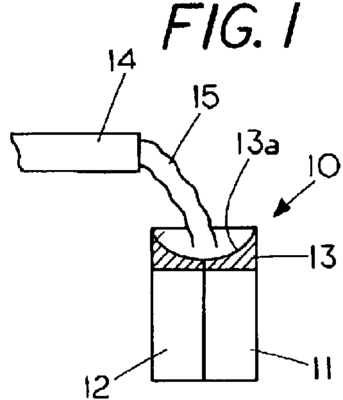
FIG. 1 shows a partial sectional view of molten metal being poured into a two-part mold having a funnel thereon with the mold having smooth mold surfaces defining the cavity therein.

FIG. 1 shows a multiple part mold 10 having mold parts 11, 12 and 13 with mold part 13 including a funnel shaped basin **13*a* for receiving molten metal and directing it through gravity into a cavity formed between mold parts 11 and 12. In operation of the casting process the molten metal 15, which is preferably molten lead or a molten lead alloy, is poured into basin 13*a* from pipe 14. The cavity formed in mold part 11 and 12** was formed with smoothly finished surfaces.

Figure 2:
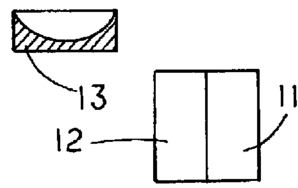
FIG. 2 shows the two-part mold with the funnel for molten metal removed.

FIG. 2 illustrates the next step in the process wherein the mold part 13 has been slid free of mold members 12 and 12 to shear off any excess solidified metal in the basin **13*a* from the part formed in mold member 11 and 12**.

Figure 3:
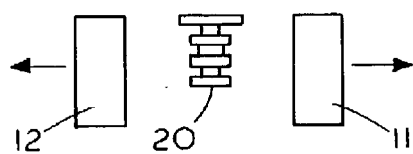
FIG. 3 shows the two part mold separated form the cast part.

FIG. 3 illustrates the mold members 11 and 12 have been laterally separated to reveal the cast part 20, which has been formed by the solidification of molten metal in the mold parts 11 and 12. Thus FIGS. 1–3 generally illustrate the steps in gravity casting a part such as a lead or lead alloy. When the process is used with a mold having a smooth surface or smooth finish on the cavity sidewalls the result is that voids and fissures occur in the final cast product. In order to avoid the problems of voids and fissures the prior art has sprayed a mixture of cork and sodium silicate onto the mold surfaces prior to pouring the molten lead into the mold. For reasons not fully understood the mixture reduces the voids and cracks occurring in the cast product. Although the process of spraying cork and sodium silicate reduces the number of voids and fissures the process must be repeated periodically during a production run or the cast parts will have increased voids or fissures. In addition to requiring extra time it is oftentimes difficult to spray in the nooks and crannies of the mold.

Figure 4:
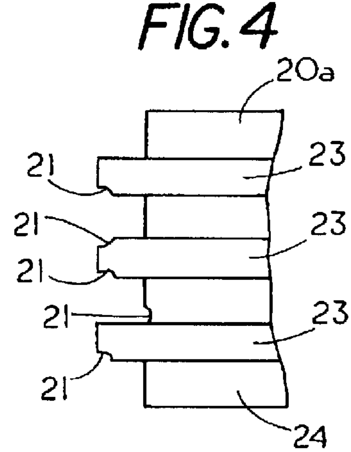
FIG. 4 is an enlarged view of a portion of the cast product revealing voids and fissures in the cast part.

In order to illustrate the problem of void and fissure formation reference should be made to FIG. 4 which shows an enlarged portion **20*a* of cast article 20 revealing the existence of voids and fissures 21 located on the surface of the cast parts. In the embodiment of FIG. 4 the mold part was cast without an application of cork and sodium silicate to the surfaces of the mold. That is, the surface of the nooks and crannies of the mold that formed the rings 23 and body 24** contained smooth surfaces. Although the surfaces of the cavity in the mold surface contained smoothly finished surfaces, for some reason or reasons the molten metal did not smoothly solidify on the smooth surfaces. The lack of the molten metal not conforming to the smooth mold surface resulted in voids or fissures in the cast part that were not part of the original mold.

Figure 5:
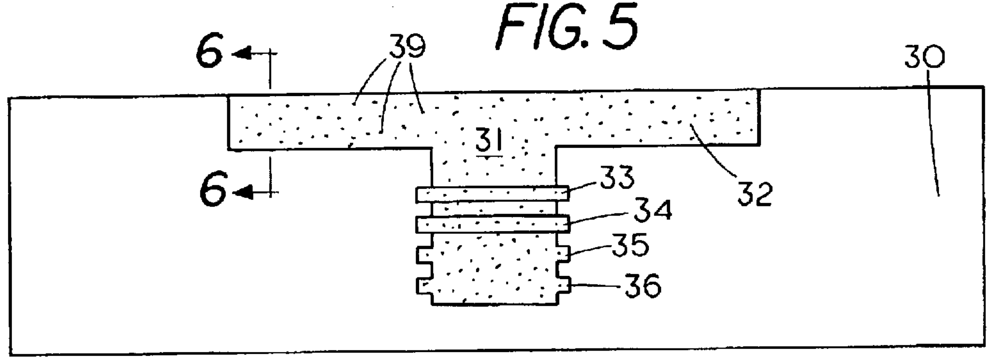
FIG. 5 is a mold part having a mold with the mold surface contains pits thereon.

FIG. 5 shows one half of a mold member 30 that cooperates with a similar part for forming a mold cavity 31 in the shape of a battery part. In the embodiment shown the surface 32 of the mold including the surfaces of the nooks and crannies 33, 34, 35 and 36 have been deliberated and permanently pitted through a process of electrical discharge machining or the like. The result is that the mold surface 32, which would normally be smooth, contains multiple pits or recesses 39 that extend through the mold surface and into the mold.

Figure 6:
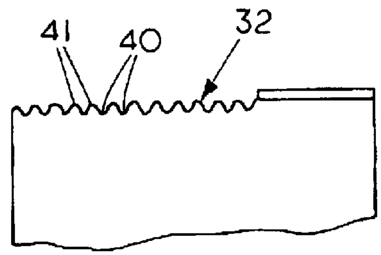
FIG. 6 is a cross-sectional view of the mold part of FIG. 5 illustrating the pitted mold surface.

FIG. 6 shows an enlarged cross sectional view taken along line 6—6 of FIG. 5 to reveal the pitted mold surface. As can be seen voids 40 are spacedly located between the mold top surfaces 41. It is the top surfaces 41 that define the structural configuration of the cast part. The voids 40 are sufficiently small so that the metal in a molten state and solely under the influence of gravity does not flow therein. This is a characteristic of the surface tension of the molten metal and can be readily determined by observing the solidification of metal on a pitted surface. For example, if the mold part sticks to the mold the pits on the mold surface are too large since some of the molten lead enters and solidifies in the pits making it difficult to remove the cast part from the mold. On the other hand if the cast part contains voids or fissures the mold surface lacks sufficient pitting. It has been found that in the casting of battery parts with lead or a lead alloy that pits having a minimum peak to valley distance on the order of about 0.010 inches are sufficient to produce a battery part that is substantially free of voids or fissures. While the size and shape of the pits in the surface can vary depending on the material cast it is the integral formation of permanent pits in the surface of the mold that allows one to cast battery parts that are substantially free of voids and cracks.

Figure 7:
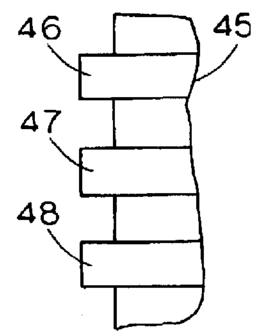
FIG. 7 shows an enlarged view of a part cast in the mold member of FIG. 5 to reveal that the cast part is free of voids and fissures.

FIG. 7 shows a part 45, which is identical in shape to the part shown in FIG. 4 except part 45, has been cast in a pitted mold while part 20*a* has been cast in a mold with smooth surfaces on the cavity of the mold. Note, the lack of voids and fissures in rings 46, 47 and 48 of mold part 45.

We claim:

1. A multiple part mold for casting a battery part comprising:

a first mold member, said first mold member having a pitted surface defining a portion of a battery part;

a second mold member, said second mold member having a pitted surface defining a further portion of a battery part, said first mold member and said second mold member coacting to form a battery part cavity having a pitted surface having a minimum depth of about ten thousandth of an inch for receiving a molten metal containing lead.

2. The multiple part mold of claim 1 wherein the pitted surface for receiving a molten metal comprises integeral recesses in the first mold member and the second mold member.

3. The multiple part mold of claim 1 wherein the pitted surface for receiving a molten metal comprises a set of voids sufficiently small so that the surface tension of the molten metal is sufficient to inhibit the molten metal from flowing therein.

4. The multiple part mold of claim 1 wherein the multiple part mold contains a mold surface configuration of a battery terminal.

5. The multiple part mold of claim 4 wherein the pitted surface for receiving a molten metal comprises a plurality of electrical discharge voids.

6. The multiple part mold of claim 4 wherein the pitted surface for receiving a molten metal extends across the entire mold surface.

7. The multiple part mold of claim 4 wherein the pitted surface for receiving a molten metal extends across a portion of the mold surface.

8. The multiple part mold of claim 4 wherein the pitted surface for receiving a molten metal is an integral part of the mold member.

9. The method of gravity casting a battery part that is substantially free of voids and fissures comprising the steps of:

a. forming a mold having a mold surfaces in the shape of a battery part;

b. pitting at least a portion of the mold surfaces with cavities that are sufficiently small so that molten lead does not flow therein, wherein the pitting step forms a pitted mold surface having a minimum depth of about ten thousandth of an inch; and c. pouring molten lead into the mold;

d. allowing the molten lead to solidify therein;

e. removing the solidified part therein to produce a gravity cast part substantially free of voids and fissures.

10. The method of claim 9 wherein the step of pitting comprises forming pits in the mold surface through a process of electrical discharge machining.

11. The method of claim 9 including the step of pitting the entire mold surface.

12. A gravity casting mold for forming a battery part comprising:

a mold member, said mold member having a cavity in the shape of a battery part with the cavity defined therein by a pitted mold surface, said pitted mold surface having pits therein sufficiently small so that a molten metal solely under the influence of gravity cannot flow therein, wherein the pitted mold surface having a minimum depth of about ten thousandth of an inch.

13. The mold of claim 12 wherein said pitted mold surface having pits therein sufficiently small so that a molten lead cannot flow therein.

14. The mold of claim 12 wherein the battery part cavity contains recesses and ridges forming nooks and crannies in the mold surface.

* * * * *